US012686486B2

(12) United States Patent
Liu

(10) Patent No.: US 12,686,486 B2
(45) Date of Patent: Jul. 21, 2026

(54) PANEL ASSEMBLY FOR CONVERTING PASSENGER AIRCRAFT TO CARGO AIRCRAFT

(71) Applicant: THE BOEING COMPANY, Arlington, VA (US)

(72) Inventor: Chunlei Liu, Rancho Palos Verdes, CA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 19/077,931

(22) Filed: Mar. 12, 2025

(65) Prior Publication Data

US 2025/0368311 A1      Dec. 4, 2025

Related U.S. Application Data

(60) Provisional application No. 63/653,061, filed on May 29, 2024.

(51) Int. Cl.
B64C 1/14          (2006.01)
B64C 1/12          (2006.01)

(52) U.S. Cl.
CPC .............. B64C 1/1415 (2013.01); B64C 1/12 (2013.01); B64C 1/1461 (2013.01)

(58) Field of Classification Search
CPC ....... B64C 1/1415; B64C 1/12; B64C 1/1461; B64C 1/068; B64C 1/069
See application file for complete search history.

(56) References Cited

U.S. PATENT DOCUMENTS 1,625,700 A * 4/1927 Black ...................... B64C 39/02
                                                                     244/119
2,387,527 A * 10/1945 Nagamatsu ............. B64C 39/02
                                                                     105/238.1

(Continued)

FOREIGN PATENT DOCUMENTS

DE      102007015007 A1 * 10/2008 ............. B64C 1/068
DE      102009057010 A1 * 6/2011 ........... B64C 1/1461
RU          2646175 C1 * 3/2018

OTHER PUBLICATIONS

Niu, Michael. Airframe Structural Design, 2nd ed. Chapter 6: Cutouts. pp. 162-206. 1999. (Year: 1999).*

*Primary Examiner* — Joshua J Michener
*Assistant Examiner* — Michael B. Kreiner
(74) *Attorney, Agent, or Firm* — Carroll, Hoette & Butscher, LLC; Christopher R. Carroll

(57)                      ABSTRACT

A panel assembly for an aircraft can include a composite material skin with a cargo opening sized to receive cargo into the fuselage of the aircraft and to remove the cargo from the fuselage of the aircraft. The panel assembly can include curved panel edge frames coupled with the outer skin and disposed on opposite lateral sides of the cargo opening in the outer skin. Upper and lower sill beams can be disposed on opposite upper and lower sides of the cargo opening in the outer skin. The upper and lower sill beams each can be coupled with the panel edge frames. The upper and lower sill beams can be coupled with curved aircraft frames that are disposed inside the fuselage of the aircraft to secure the outer skin to the aircraft at a panel opening in the fuselage of the aircraft.

20 Claims, 7 Drawing Sheets

(56)  References Cited

U.S. PATENT DOCUMENTS

| | | | | |
|---|---|---|---|---|
| 2,442,459 | A | * | 6/1948 | Fowler .................... B65D 88/14 |
| | | | | 220/1.5 |
| 2,547,811 | A | * | 4/1951 | Burnelli .................. B64C 39/02 |
| | | | | 244/129.5 |
| 2,759,691 | A | * | 8/1956 | Weaver ................. B64C 1/1415 |
| | | | | 244/118.3 |
| 3,119,441 | A | * | 1/1964 | Furry, Jr. .............. B64C 1/1407 |
| | | | | 244/129.5 |
| 5,421,539 | A | * | 6/1995 | Carducci .................. B64D 9/00 |
| | | | | 244/118.1 |
| 7,967,250 | B2 | * | 6/2011 | Lobato .................... B64C 1/064 |
| | | | | 244/119 |
| 8,240,607 | B2 | * | 8/2012 | Pahl ...................... B64C 1/0685 |
| | | | | 244/120 |
| 8,939,406 | B2 | * | 1/2015 | Dopker .................. B64C 1/069 |
| | | | | 244/119 |
| 9,415,871 | B1 | * | 8/2016 | Paul ......................... B64C 1/20 |
| 10,144,497 | B2 | * | 12/2018 | Nordman .............. B64C 1/1461 |
| 10,308,342 | B2 | * | 6/2019 | Staal ....................... B64C 1/069 |
| 11,420,718 | B2 | * | 8/2022 | Joseph ................... B64C 1/064 |
| 11,618,544 | B2 | * | 4/2023 | Linde ................ B29D 99/0014 |
| | | | | 244/119 |
| 11,623,727 | B2 | * | 4/2023 | Pahl ........................ B64C 1/068 |
| | | | | 244/129.5 |
| 11,697,487 | B2 | * | 7/2023 | Linde ..................... B64C 1/064 |
| | | | | 244/119 |
| 12,091,195 | B2 | * | 9/2024 | Aguera ..................... B64C 1/18 |
| 2012/0213955 | A1 | * | 8/2012 | Biesek ................. B29C 66/721 |
| | | | | 428/34.1 |
| 2023/0271716 | A1 | * | 8/2023 | Martins .................. B64D 37/06 |
| | | | | 244/135 R |
| 2025/0100669 | A1 | * | 3/2025 | Poe ......................... B64C 1/064 |
| 2025/0187756 | A1 | * | 6/2025 | Cournet ................. B64C 1/068 |
| 2025/0269975 | A1 | * | 8/2025 | Hegenbart ............... B64C 1/08 |

* cited by examiner

800

| Form outer skin of panel assembly | 802 |
| Attach frames to skin | 804 |
| Attach sill beams to frames | 806 |
| Couple panel assembly to fuselage | 808 |

PANEL ASSEMBLY FOR CONVERTING PASSENGER AIRCRAFT TO CARGO AIRCRAFT

CROSS-REFERENCE TO RELATED APPLICATIONS

This application claims priority to U.S. Provisional Application No. 63/653,061 (filed 29 May 2024), the entire disclosure of which is incorporated herein by reference.

FIELD OF THE DISCLOSURE

Examples of the subject matter described herein relate to structures forming aircraft fuselages.

BACKGROUND OF THE DISCLOSURE

Vehicles such as commercial aircraft are used to transport passengers and/or cargo between various locations. A passenger aircraft can include cabin doors leading to an internal cabin having seats for passengers. A cargo or freighter aircraft can include a main deck compartment with larger cargo doors for loading and unloading non-passenger cargo. That is, a cargo aircraft can include an internal cabin dedicated to transporting cargo instead of passengers.

Some freighter aircraft may become obsolete due to changing regulations, such as environmental regulations. The cost for replacing obsolete freighter aircraft with brand new freighter can be significant, however. Passenger aircraft may be capable of being modified into freighter aircraft in a passenger-to-freighter (P2F) conversion process. This process can involve cutting a large opening in the fuselage of the passenger aircraft and installing a large cargo door in this opening in the fuselage to allow loading and unloading cargo to a main deck compartment of the converted aircraft.

For a metallic passenger aircraft, the aircraft can be made with longitudinal sections of fuselage skin having both longitudinal and circumferential joining seams. These seams can be in locations where a panel is to be removed, and a new metallic panel (with the cargo door) can be positioned to replace the removed metallic panel. With composite fuselages, however, there may not be any existing seams for use in selecting a panel for removal since composite fuselage barrel have an integral, one-piece skin panel that is wound by a composite tape winding machine. Instead, the composite fuselage may need to be cut in an appropriate location to achieve proper loading capabilities (in freighter configuration) as well as being able to accommodate longitudinal splices and circumferential splices.

Therefore, the traditional method to create a large opening with reinforced thicker skin for a metallic aircraft P2F conversion process may not be applicable for composite aircraft. One potential solution could be fabricating an entire fuselage barrel from the composite material, with the fuselage barrel formed to have the large opening for the cargo door. A section of the fabricated fuselage barrel with the large opening for the cargo door can then be cut off and used to replace the removed fuselage section on the passenger aircraft to be converted into freighter. The remaining portion of the newly fabricated fuselage barrel, however, may then be scrapped. This approach may not be economically feasible since the scrapped portion of the newly fabricated barrel is much larger than the portion that is cut off and installed on the freighter aircraft.

SUMMARY OF THE DISCLOSURE

A panel assembly for an aircraft can include an outer skin formed from a composite material and configured to form an outer surface of a portion of a fuselage of the aircraft. The outer skin can include a cargo opening sized to receive cargo into the fuselage of the aircraft and to remove the cargo from the fuselage of the aircraft. The panel assembly can include curved panel edge frames coupled with the outer skin and disposed on opposite lateral sides of the cargo opening in the outer skin. Upper and lower sill beams can be disposed on opposite upper and lower sides of the cargo opening in the outer skin. The upper and lower sill beams each can be coupled with the panel edge frames. The upper and lower sill beams can be coupled with curved aircraft frames that are disposed inside the fuselage of the aircraft to secure the outer skin to the aircraft at a panel opening in the fuselage of the aircraft.

A method for providing a panel assembly for an aircraft includes forming an outer skin of an aircraft from a composite material. The outer skin can be formed to have a shape of a portion of an outer surface of a fuselage of the aircraft. The outer skin can be formed to include a cargo opening sized to receive cargo into the fuselage of the aircraft and to remove the cargo from the fuselage of the aircraft. The method can include attaching curved panel edge frames to the outer skin with the panel edge frames disposed on opposite lateral sides of the cargo opening in the outer skin, and attaching upper and lower sill beams to the panel edge frames with the upper and lower sill beams disposed on opposite upper and lower sides of the cargo opening in the outer skin. The upper and lower sill beams each can be attached with the panel edge frames. The upper and lower sill beams also can be attached with curved aircraft frames that are disposed inside the fuselage of the aircraft to secure the outer skin to the fuselage at a panel opening in the fuselage.

A panel assembly for converting a passenger aircraft to a freighter aircraft can include an outer skin having a curved shaped to replace a removed portion of a fuselage of the passenger aircraft. The outer skin includes a cargo opening sized to transfer cargo into and out of the fuselage. The panel assembly can include elongated edge frames coupled with the outer skin and on opposite first and second sides of the cargo opening in the outer skin. The panel assembly can include an upper sill beam set disposed on a third side of the cargo opening in the outer skin. The upper sill beam set can include parallel upper sill beams connected with the edge frames and shaped to be coupled with elongated aircraft frames to secure the outer skin to the fuselage. The panel assembly can include a lower sill beam set disposed on a fourth side of the cargo opening in the outer skin. The lower sill beam set can include parallel lower sill beams connected with the edge frames and shaped to be coupled with the aircraft frames to secure the outer skin to the fuselage.

DETAILED DESCRIPTION OF THE DISCLOSURE

Figure 1:
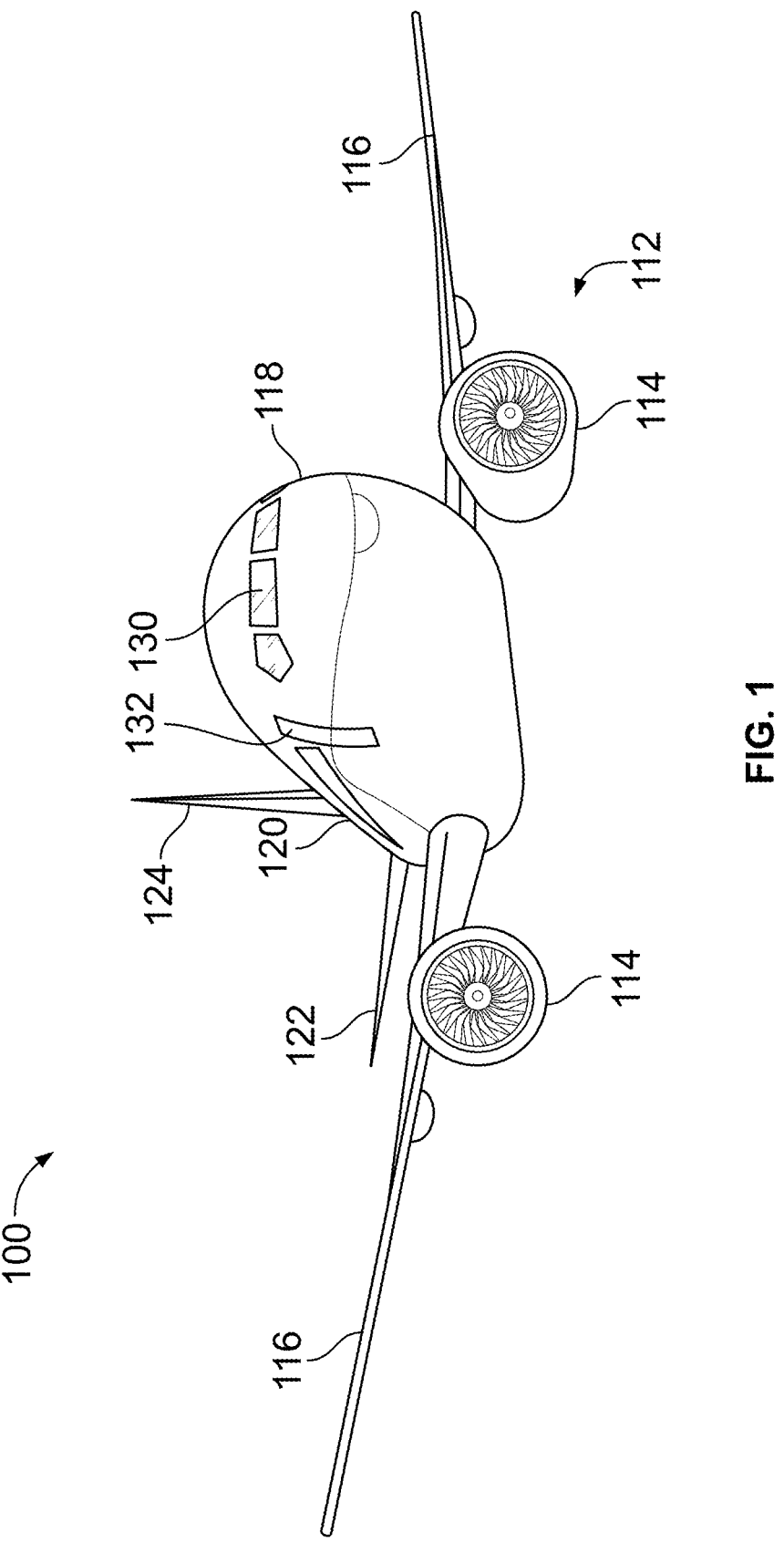
FIG. 1 illustrates a perspective front view of one example of an aircraft.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

As described herein, examples of the present disclosure provide a panel assembly that can be fabricated and used to replace a removed section of a passenger aircraft fuselage to convert the passenger aircraft into a cargo-carrying or freighter aircraft. The panel assembly may be fabricated rather than removed from a donor aircraft. This can avoid the expense and waste of replacing the removed fuselage section with a portion of the fuselage from the donor aircraft. Additionally, because the panel assembly is fabricated only to be large enough to replace the removed fuselage section, the expense of fabricating an entire fuselage barrel is avoided.

The panel assembly can include a composite skin and stringer panel that can be shaped to reinforce the surround of a main deck cargo door (MDCD) opening in which a MDCD is later positioned. The panel can be fabricated to include the MDCD opening. The panel (or at least the skin of the panel) can be formed from a composite material. For example, the panel and/or panel skin may be formed from a carbon-fiber reinforced polymer (CFRP). The panel and/or panel skin can be created using hand layup or an automated fiber placement (AFP) machine. The tooling for the skin of the panel can be either inner mode line (IML) or outer mode line (OML) tooling.

In one example, the panel assembly can include elongated edge frames on opposite sides of the MDCD opening (or cargo door opening). These edge frames may be curved along and connected to an inner surface of the skin. The edge frames may follow the contour of the circumference of the fuselage (of the aircraft that is being converted). Upper and lower sill beams may be connected to the inner surface of the skin above and below the cargo door opening. The edge frames and sill beams can be formed from a material other than the composite material of the panel. For example, the edge frames and the sill beams can be formed from a different type of composite material. Additional frames may be coupled to the inner surface of the skin between the edge frames. These additional frames may be referred to as interior frames as these frames are between the outer edge frames. The interior frames can be fabricated from a composite material, such as the same composite material as the skin.

Fittings and fasteners can be used to couple the panel assembly to the opening formed by removing a fuselage section of an aircraft. These fittings and fasteners can be machined with the same material as the interior frames or from another material. The fittings may include lower sill elbow fittings (also referred to as door latch supporting fittings). Optionally, other fittings (e.g., smaller fittings) can be machined from another material such as aluminum or aluminum alloy.

The panel assembly can be fabricated and assembled in one location (e.g., in a shop) and then transported to the location of the aircraft that is being converted. The panel assembly may then be positioned to replace the removed section of the fuselage and coupled with the remaining portion of the fuselage at the location of the aircraft being converted. This can reduced challenges associated with fabrication and assembly of panels at the location where the aircraft is being converted. Additionally, usage of the panel assembly can reduce the overall time needed to convert the aircraft (compared with using a donor aircraft or fabricating an entire donor fuselage barrel to convert the aircraft).

In one example, the composite panel assembly can be pre-fabricated, pre-assembled, and transported to the location where an incoming aircraft (e.g., a passenger-carrying aircraft) is to be modified into an outgoing aircraft (e.g., a cargo-carrying or freighter aircraft). A portion of the fuselage structure that is sized to accept the replacement panel assembly can be cut and removed from the incoming aircraft. The removed portion may be slightly larger than the panel assembly to allow for splicing or other joining of the panel assembly to the remaining fuselage structure. The panel assembly can be attached to the incoming airplane where the portion of the fuselage structure was removed. As described herein, longitudinal splices and/or circumferential splices can be used to couple the panel assembly to the incoming aircraft. The circumferential splices may connect stringer structures coupled to inside surfaces of the panel assembly skin and the incoming aircraft fuselage skin along opposite lateral edges of the panel assembly. Longitudinal splices may connect opposite top and bottom edges of the panel assembly to the incoming aircraft fuselage. The circumferential splices can include an elongated splice strap disposed over the interface between the panel assembly skin and the incoming aircraft skin, as well as transverse splice bodies disposed over the splice strap and oriented transverse to the splice strap. First ends of the splice bodies can be coupled with the panel assembly skin, and opposite second ends of the splice bodies can be coupled with the incoming aircraft skin. The incoming aircraft fuselage has now been converted into an outgoing aircraft fuselage. For example, the passenger aircraft has now been converted into a freighter aircraft with a large cargo door disposed in the panel assembly.

The panel assembly may be sized based on the loads around the panel assembly (once attached to the aircraft fuselage). Several fore-and-aft loads in the aircraft must go around the cargo opening in the panel assembly. The loads in the panel assembly can decrease as the loads spread further in the panel assembly. The panel assembly may be large enough to allow the loads to decrease to a level which can easily be handled by longitudinal and circumferential splice structures that splice the panel assembly back to the fuselage. Additionally, the panel assembly may be sized to be transferred by typical transportation methods, such as eighteen wheelers, aircraft, boat, barge, etc. The panel assembly may be large enough to have extra two frame-bays in front of and beyond the edge of the cargo door hole in the middle of the panel assembly, and 6 to 7 string-bays above and below the edge of the cargo door hole in the middle of the panel assembly. A frame-bay may be the spacing between two of the frames described herein. A stringer-bay may be the spacing between two stringers described herein.

While examples used herein describe replacing portions of fuselages to convert aircraft from a passenger aircraft to a freighter aircraft, not all examples are limited to such a conversion unless explicitly limited in that way. The panel assembly may be fabricated to replace a portion of a fuselage to convert a freighter aircraft to a passenger aircraft. Optionally, the panel assembly may be used to otherwise repair or replace part of an aircraft fuselage for purposes other than conversion (e.g., repair, updating, upgrading, etc.).

FIG. 1 illustrates a perspective front view of one example of an aircraft 100. The aircraft 100 includes a propulsion system 112 that includes engines 114, for example. Optionally, the propulsion system 112 may include more engines 114 than shown. The engines 114 are carried by wings 116 of the aircraft 100. In other examples, the engines 114 may be carried by a fuselage 118 and/or an empennage 120. The empennage 120 may also support horizontal stabilizers 122 and a vertical stabilizer 124.

The fuselage 118 of the aircraft 100 defines an internal cabin 130. The fuselage 118 may include a passenger door 132 that is sized for passengers to enter into and exit the aircraft 100. The passenger door 132 may be, for example, a type I passenger door (an opening that is no less than twenty-four inches wide by forty-eight inches tall), type A passenger door (an opening that is no less than forty-two inches wide by seventy-two inches tall), a door having an opening that is no larger than 1.9 meters tall and 1.1 meters wide, or the like. A portion of the fuselage 118 can be removed and replaced with a panel assembly to convert the aircraft 100 from a passenger aircraft to a freighter aircraft. For example, the portion of the fuselage 118 that includes the passenger door 132 may be removed and replaced with a panel assembly having a larger cargo opening for a cargo door. The cargo door may define an opening that is at least ninety-five inches tall and at least one hundred twenty inches wide.

Figure 2:
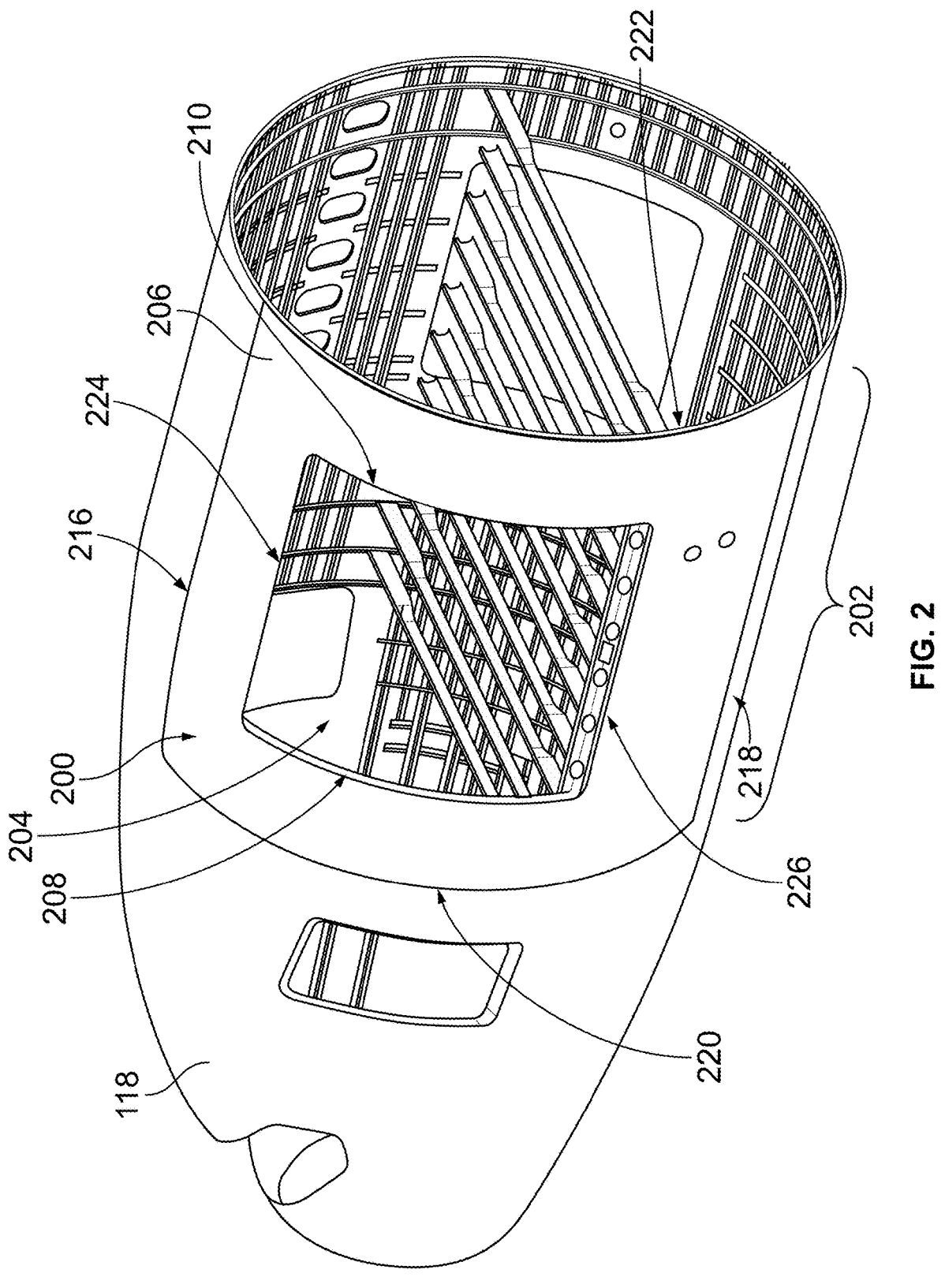
FIG. 2 illustrates a perspective view of a fuselage of the aircraft shown in FIG. 1 with a panel assembly that converts the aircraft.
Figure 3:
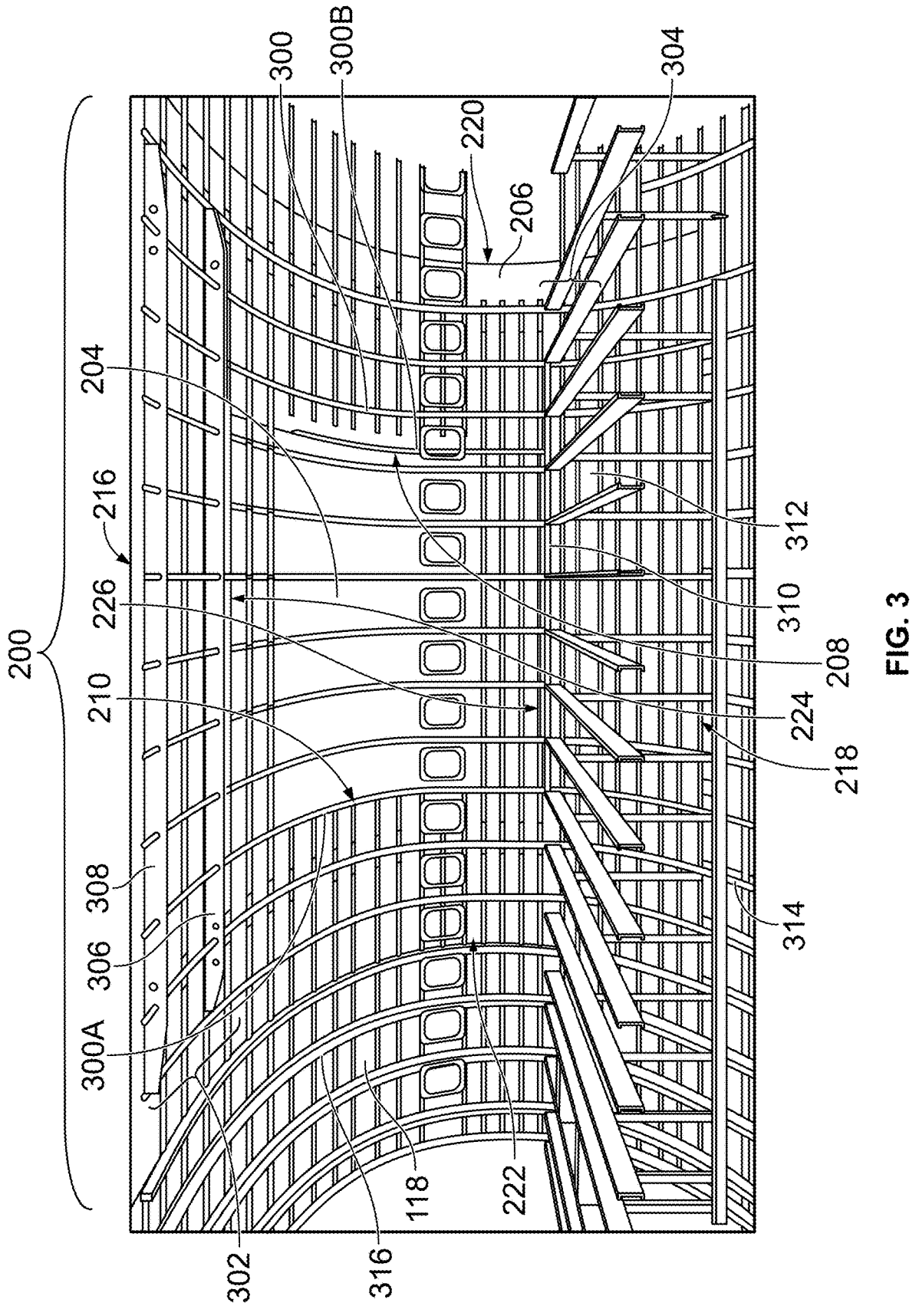
FIG. 3 illustrates an interior of the fuselage with the panel assembly shown in FIG. 2.

FIG. 2 illustrates a perspective view of the fuselage 118 of the aircraft 100 shown in FIG. 1 with a panel assembly 200 that converts the aircraft 100. FIG. 3 illustrates an interior of the fuselage 118 with the panel assembly 200 shown in FIG. 2. A portion 202 of the fuselage 118 can be removed, such as by cutting the portion 202 from the fuselage 118. Removing the portion 202 leaves an opening in the fuselage 118 in which the panel assembly 200 is placed. The panel assembly 200 includes a cargo door opening 204 in which a cargo door may be placed. As described above, the cargo door opening 204 may be larger than the opening of the passenger door 132 (shown in FIG. 1) previously in the removed portion 202 of the fuselage 118, as described above. The cargo opening 204 can be bounded by an upper inner edge 224 of the skin 206, a lower inner edge 226 of the skin 206 that is opposite of the upper inner edge 224, a first lateral inner edge 208 of the skin 206, and a second lateral inner edge 210 of the skin 206 that is opposite the first lateral inner edge 208.

With continued reference to the aircraft 100 shown in FIGS. 1 through 3, FIG. 4 schematically illustrates one example of the panel assembly 200 shown in FIGS. 2 and 3. The panel assembly 200 includes an outer skin 206 that can be formed from a composite material, such as CFRP. The outer skin 206 can form or provide an outer surface of a portion of the fuselage 118 of the aircraft 100 while the panel assembly 200 is coupled with the fuselage 118. The outer skin 206 can include the cargo opening 204 that is sized to receive cargo into the fuselage 118 of the aircraft 100 and to remove the cargo from the fuselage 118 of the aircraft 100. The outer skin 206 can be curved, or convex, to match the outer contour of the fuselage 118, or at least the outer contour of the removed portion of the fuselage 118.

The skin 206 may extend from an upper outer side or edge 216 to an opposite lower outer side or edge 218 and may extend from a first lateral outer side or edge 220 to an opposite, second lateral outer side or edge 222. Each of the upper and lower edges 216, 218 may extend from one lateral edge 220 to the other lateral edge 222. Each of the lateral edges 220, 222 may extend from the upper edge 216 to the lower edge 218. These edges 216, 218, 220, 222 may form the outer boundary of the skin 206.

The panel assembly 200 also can include several elongated and curved frames 300 coupled with the outer skin 206. These frames 300 can be convex and follow the contour of the curved inner or inside surface of the skin 206. The frames 300 can be parallel to each other, and may be disposed at or near the opposite lateral inner sides 208, 210 of the skin 206. The frames 300 may be parallel to each other between the first outer lateral edge 220 and the first inner lateral edge 208 of the skin 206, and may be parallel to each other between the second outer lateral edge 222 and the second inner lateral edge 210 of the skin 206. The frames 300 can be spaced apart or otherwise positioned to align with corresponding frames 314 inside the fuselage 118 of the aircraft 100. This can allow the panel frames 300 to align with the aircraft frames 314. For example, ends of the panel frame 300 may be coupled with ends of the aircraft frames 314 that are exposed when the opening is cut into the fuselage 118 to make room for the panel assembly 200.

The frames 300 may extend up to the opening 204 and be attached to the sill beams 306, 308, 310, 312, thereby leaving the opening 204 for the cargo door. The frames 300 that are closer, or closest, to the lateral sides or edges 208, 210 of the cargo opening 204 may be referred to as edge frames (and are labeled as frames 300A, 300B in FIGS. 3 and 4), as these frames 300 bound the lateral sides or edges 208, 210 of the cargo opening 204. The fuselage 118 may have additional frames 316 along the inner concave surface of the skin of the fuselage 118.

The panel assembly 200 includes an upper sill beam set 302 and a lower sill beam set 304. The upper sill beam set 302 includes a first upper sill beam 306 and an auxiliary upper sill beam 308. The lower sill beam set 304 includes a first lower sill beam 310 and an auxiliary lower sill beam 312. Each of the sill beams 306, 308, 310, 312 can be an elongated beam or body that is elongated in a direction that is transverse (e.g., perpendicular) to the frames 300 of the panel assembly 200. The sill beams 306, 308, 310, 312 in each set 302, 304 may be parallel to each other and parallel to the longitudinal axis of the aircraft 100 or fuselage 118. Additionally, the sill beams 306, 308, 310, 312 may all be parallel to each other.

The sill beams 306, 308, 310, 312 may be disposed on opposite sides of the cargo opening 204 (e.g., above and below the opening 204) and along the inner concave surface of the skin 206. The upper sill beams 306, 308 of the upper sill beam set 302 may be above the upper inner edge 224 of the skin 206 and the upper outer edge 216 of the skin 206. The lower sill beams 310, 312 may be between the lower inner edge 226 of the skin 206 and the lower outer edge 218 of the skin 206. As shown, outer opposite ends of the sill beams 306, 308, 310, 312 may extend beyond the edges of the cargo opening 204 (e.g., the inner lateral edges 208, 210 of the skin 206). The sill beams 306, 308, 310, 312 may provide structural reinforcement of the panel assembly 200 above and below the cargo opening 204. For example, the sill beams 306, 308, 310, 312 may be coupled with the frames 300 to increase the strength of the panel assembly 200 around the cargo opening 204 (e.g., relative to the sill beams 306, 308, 310, 312 being absent and/or relative to the sill beams 306, 308, 310, 312 not being coupled with the frames 300). In one example, the sill beams 306, 308, 310, 312 are coupled with the edge frames 300 on opposite lateral sides of the cargo opening 204.

Figure 4:
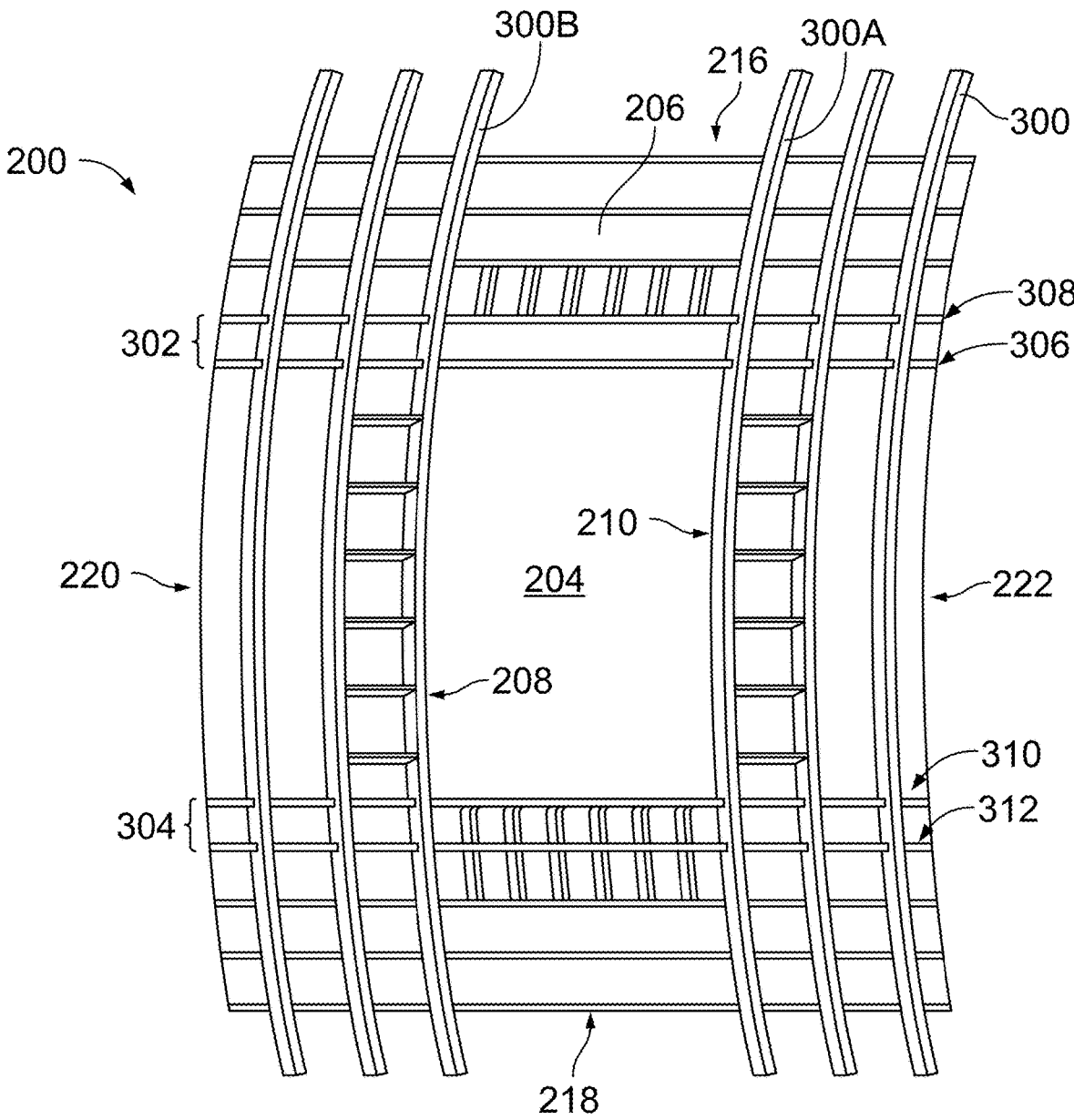
FIG. 4 schematically illustrates one example of the panel assembly shown in FIGS. 2 and 3.

As shown in FIG. 4, the frames 300 of the panel assembly 200 may protrude beyond the upper and lower outer edges 216, 218 of the skin 206. The protruding sections of the frames 300 that extend beyond the edges 216, 218 of the skin 206 may be coupled with the skin forming part of the fuselage 118 of the aircraft 100 that is being converted. This can help secure the panel assembly 200 to the aircraft 100. For example, the panel assembly 200 can be connected to the fuselage 118 of the aircraft 100 using different types of splices along different outer edges 216, 218, 220, 222 of the skin 206.

Figure 5:
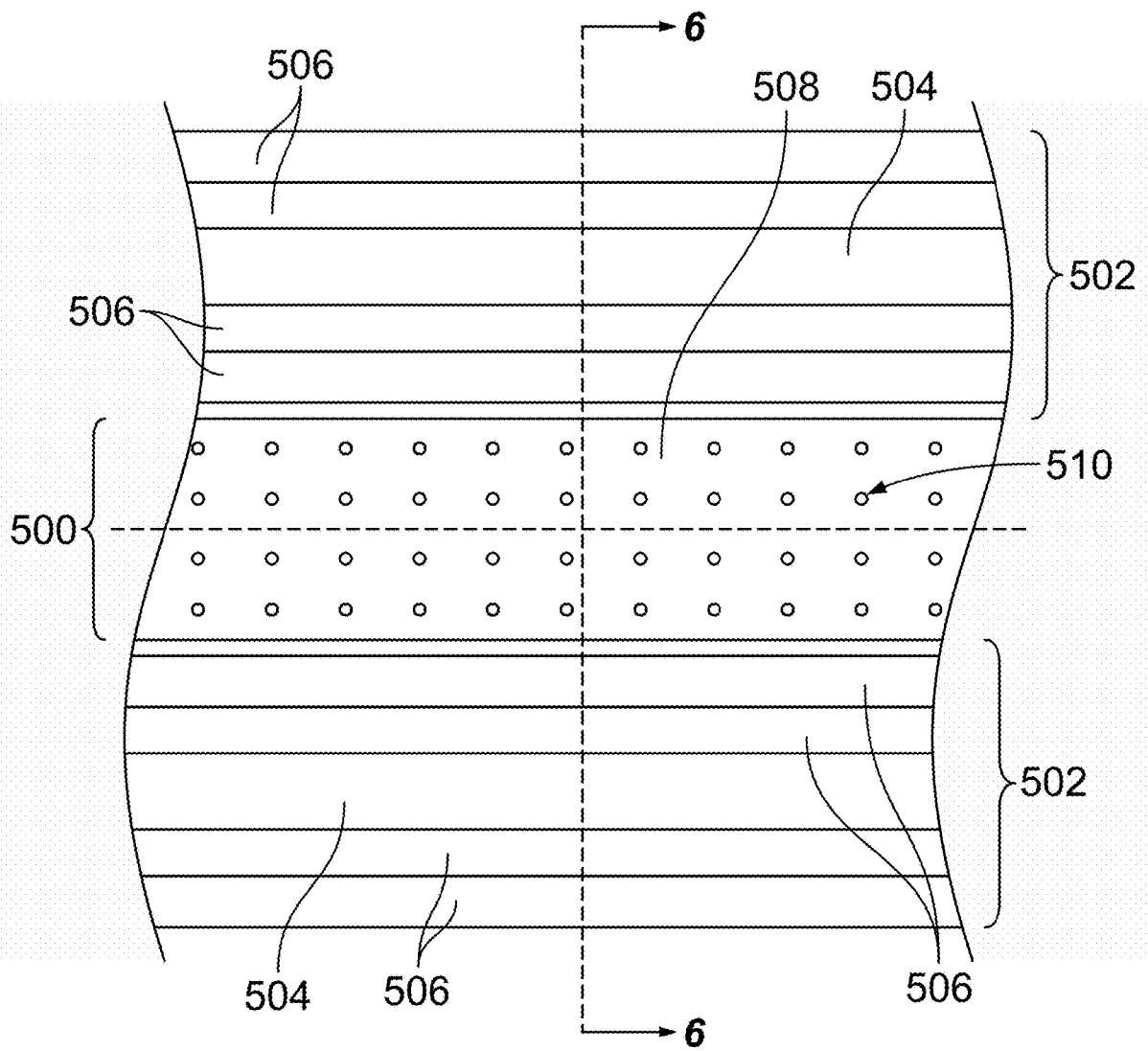
FIG. 5 illustrates a front view of one example of a longitudinal splice between aircraft skin and panel assembly skin shown in FIGS. 2 through 4.
Figures 6, 7:
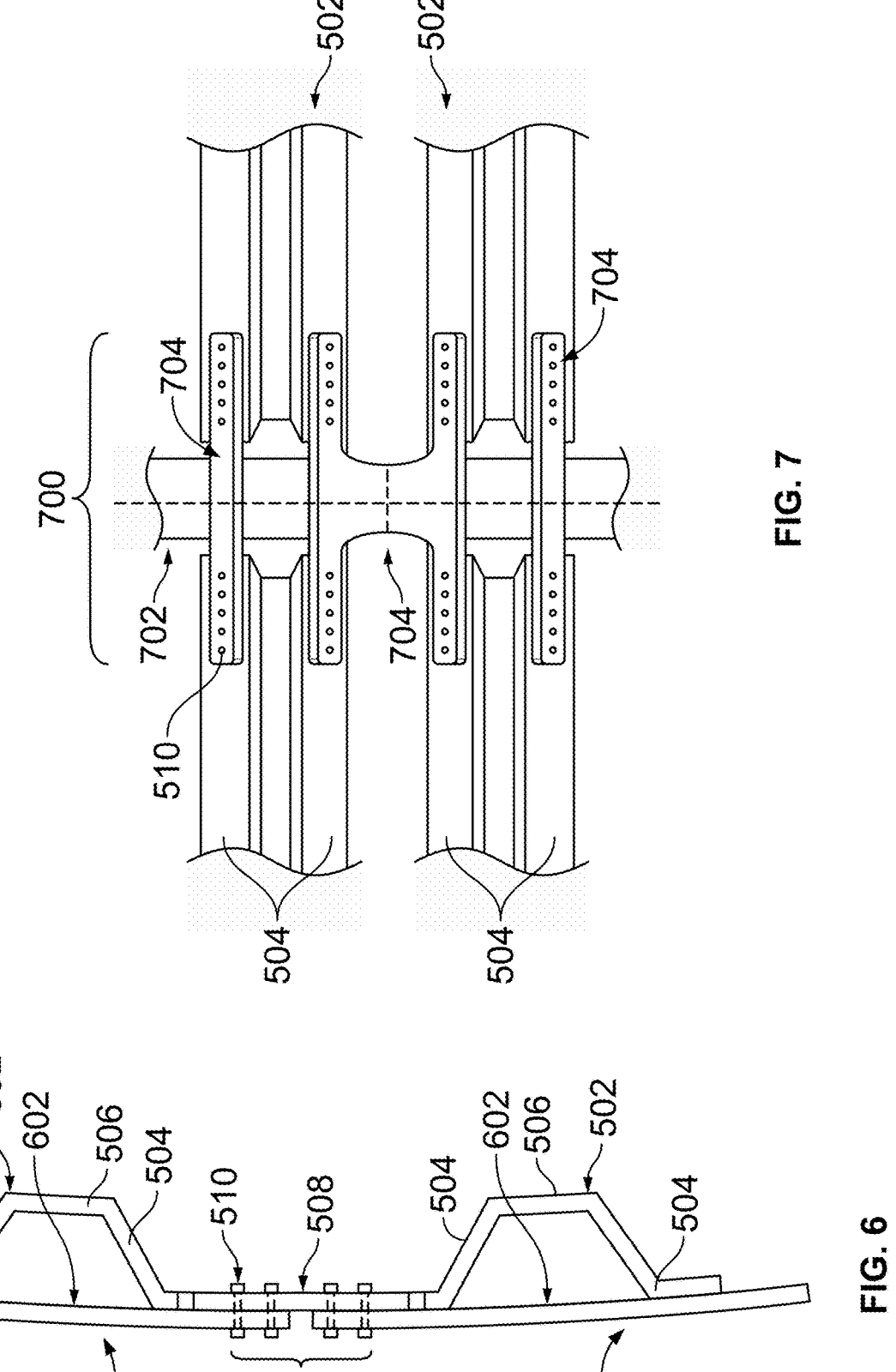
FIG. 6 illustrates a cross-sectional view of the longitudinal splice along line 6-6 in FIG. 5.
FIG. 7 illustrates a front view of one example of a circumferential splice between the aircraft skin and the panel skin.

FIG. 5 illustrates a front view of one example of a longitudinal splice 500 between a skin 600 (shown in FIG. 6) of the fuselage 118 of the aircraft 100 shown in FIG. 1 and the skin 206 of the panel assembly 200 shown in FIGS. 2 through 4. FIG. 6 illustrates a cross-sectional view of the longitudinal splice 500 between the skins 600, 206 along line 6-6 in FIG. 5. The skin 600 can represent the portion of the fuselage 118 that is outside of or surrounds the hole that is cut into the fuselage 118 to make room for the panel assembly 200. One longitudinal splice 500 may be positioned at the interface between the panel skin 206 and the aircraft skin 600 along the upper outer edge 216 of the panel skin 206. Another longitudinal splice 500 may be positioned at the interface between the panel skin 206 and the aircraft skin 600 along the lower outer edge 218 of the panel skin 206.

The skins 206, 600 may have stringers 502 coupled to inside surfaces 602 of the skins 206, 600. These stringers 502 may be elongated along the longitudinal axis of the aircraft 100 (e.g., along the length of the aircraft 100). The stringers 502 can include angled legs 504 on opposite sides of a bridge body 506. The legs 504 extend from the bridge body 506 toward the skins 206, 600. The bottom ends of the legs 504 can be coupled (e.g., adhered or using fasteners) to the skins 206, 600 such that the bridge body 506 is spaced apart from the skins 206, 600. The bridge body 506 may be a predominantly flat body that is elongated along the length of the aircraft 100.

The longitudinal splice 500 can include an elongated splice strap 508 placed between one of the stringers 502 coupled with the skin 600 of the aircraft 100 and another stringer 502 of the skin 206 of the panel assembly 200. For example, one longitudinal splice 500 can be positioned between (a) the stringer 502 connected to the aircraft skin 600 that is closest to the upper edge of the hole formed for the panel assembly 200 and (b) the stringer 502 connected to the panel skin 206 that is closest to the upper outer edge 216 of the panel skin 206 (for the longitudinal splice 500 along the upper outer edge 216 of the panel skin 206). Another longitudinal splice 500 can be positioned between (c) the stringer 502 connected to the aircraft skin 600 that is closest to the lower edge of the hole formed for the panel assembly 200 and (d) the stringer 502 connected to the panel skin 206 that is closest to the lower outer edge 218 of the panel skin 206 (for the longitudinal splice 500 along the lower outer edge 218 of the panel skin 206).

The splice strap 508 can be placed over the interface between the skins 206, 600. For example, the edges of the skins 206, 600 can be placed next to each other to abut each other (e.g., in a butt splice) and the splice strap 508 can be positioned over these edges, as shown in FIG. 6. Several fasteners 510 may be placed through the splice strap 508 and the skins 206, 600 as shown in FIG. 6. This can secure the panel skin 206 to the aircraft skin 600 along the outer edges 216, 218 of the panel skin 206.

FIG. 7 illustrates a front view of one example of a circumferential splice 700 between the aircraft skin 600 and the panel skin 206. The circumferential splice 700 may be used to join the outer lateral edges 220, 222 of the panel skin 206 to the aircraft skin 600. For one example, one circumferential splice 700 may be positioned at the interface between the panel skin 206 and the aircraft skin 600 along the lateral outer edge 220 of the panel skin 206. Another circumferential splice 700 may be positioned at the interface between the panel skin 206 and the aircraft skin 600 along the other lateral outer edge 222 of the panel skin 206.

The circumferential splice 700 can include an elongated splice strap 702 placed over the interface between the aircraft skin 600 and the panel skin 206. Several splice angle connectors 704, 706 may be placed over the splice strap 702 and the ends of the legs 504 of the stringers 502. These splice angle connectors 704, 706 may have fasteners 510 extending through and coupling the splice angle connectors 704, 706 and the stringers 502 This can secure the panel skin 206 to the aircraft skin 600 along the lateral edges 220, 222 of the panel skin 206.

Figure 8:
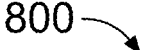
FIG. 8 illustrates a flowchart of one example of a method for converting an aircraft.
Figure 8:
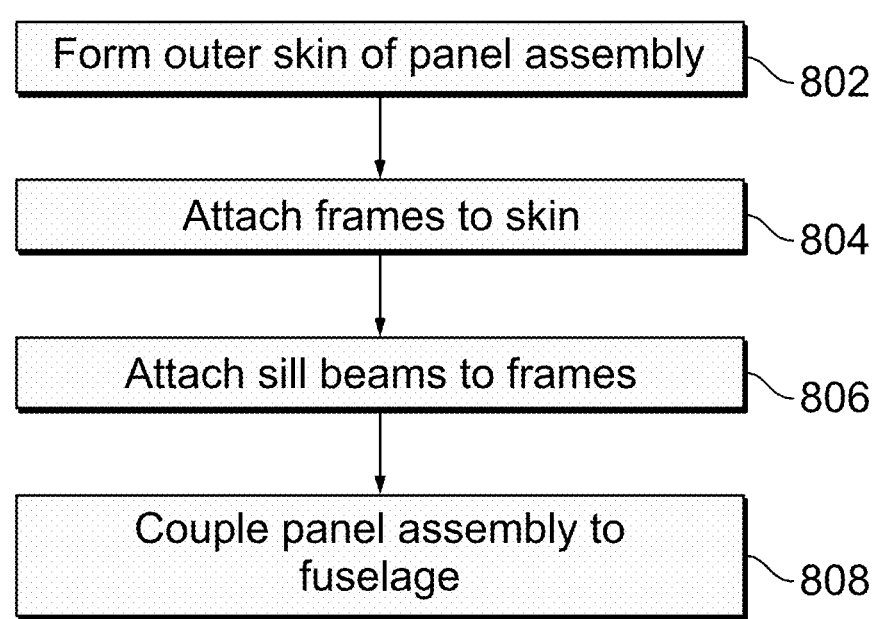

FIG. 8 illustrates a flowchart of one example of a method 800 for converting an aircraft. The method 800 may represent operations performed to convert the fuselage 118 of the aircraft 100 (e.g., from a passenger aircraft to a freighter aircraft). Optionally, the method 800 may be used to repair the fuselage 118 of the aircraft 100 by replacing part of the fuselage 118. At 802, an outer skin of an aircraft is formed. This outer skin can be formed from a composite material. The outer skin can be formed to have a shape of a portion of an outer surface of a fuselage of the aircraft. The outer skin can be formed to include a cargo opening sized to receive cargo into the fuselage of the aircraft and to remove the cargo from the fuselage of the aircraft. At 804, curved panel frames are attached the outer skin with the panel edge frames disposed on opposite lateral sides of the cargo opening in the outer skin. At 806, upper and lower sill beams are attached to the panel edge frames with the upper and lower sill beams disposed on opposite upper and lower sides of the cargo opening in the outer skin. The upper and lower sill beams each can be attached with the panel edge frames. The upper and lower sill beams can be positioned to attach with curved aircraft frames that are disposed inside the fuselage of the aircraft to secure the outer skin to the fuselage at a panel opening in the fuselage. This can create the panel assembly described herein. At 808, the panel assembly is coupled with the fuselage having an opening cut through the fuselage to convert the aircraft. The panel assembly can be coupled with the fuselage using longitudinal splices and circumferential splices, for example. Additionally, the panel frames may be aligned with and connected to the aircraft frames so that the connected frames encircle the interior of the fuselage once the panel assembly is coupled with the aircraft.

Further, the disclosure comprises examples according to the following clauses:

Clause 1: A panel assembly for an aircraft, the panel assembly comprising: an outer skin formed from a composite material and configured to form an outer surface of a portion of a fuselage of the aircraft, the outer skin including a cargo opening sized to receive cargo into the fuselage of the aircraft and to remove the cargo from the fuselage of the aircraft; curved panel edge frames coupled with the outer skin and disposed on opposite lateral sides of the cargo opening in the outer skin; and upper and lower sill beams disposed on opposite upper and lower sides of the cargo opening in the outer skin, the upper and lower sill beams each coupled with the panel edge frames, wherein the upper and lower sill beams are configured to also be coupled with curved aircraft frames that are disposed inside the fuselage of the aircraft to secure the outer skin to the aircraft at a panel opening in the fuselage of the aircraft.

Clause 2: The panel assembly of clause 1, wherein the upper and lower sill beams are configured to be coupled with the aircraft frames to enclose the panel opening and convert the aircraft from a passenger aircraft to a freighter aircraft.

Clause 3: The panel assembly of clause 1, wherein the outer skin is formed from a carbon-fiber reinforced material.

Clause 4: The panel assembly of clause 1, wherein the panel edge frames are formed from a carbon-fiber reinforced material.

Clause 5: The panel assembly of clause 1, wherein the upper sill beams include a first upper sill beam and an auxiliary upper sill beam oriented parallel to each other with both the first upper sill beam and the auxiliary upper sill beam coupled with the panel edge frames and configured to be coupled with the aircraft frames.

Clause 6: The panel assembly of clause 1, wherein the lower sill beams include a first lower sill beam and an auxiliary lower sill beam oriented parallel to each other with both the first lower sill beam and the auxiliary lower sill beam coupled with the panel edge frames and configured to be coupled with the aircraft frames.

Clause 7: The panel assembly of clause 1, wherein the outer skin extends from an upper edge to an opposite lower edge and from a forward edge to an opposite rear edge with each of the upper edge and the lower edge extending from the forward edge to the rear edge, each of the panel edge frames protruding from the upper edge and from the lower edge of the outer skin.

Clause 8: The panel assembly of clause 1, wherein the outer skin extends from an upper edge to an opposite lower edge and from a forward edge to an opposite rear edge with each of the upper edge and the lower edge extending from the forward edge to the rear edge, the outer skin configured to be coupled with the fuselage of the aircraft using longitudinal splices extending along the upper edge and the lower edge of the outer skin and using circumferential splices extending along the forward edge and the rear edge of the outer skin.

Clause 9. The panel assembly of clause 1, wherein the panel edge frames are positioned to align with and be connected to corresponding aircraft frames disposed inside the fuselage of the aircraft.

Clause 10: A method for providing a panel assembly for an aircraft, the method comprising: forming an outer skin of an aircraft from a composite material, the outer skin formed to have a shape of a portion of an outer surface of a fuselage of the aircraft, the outer skin formed to include a cargo opening sized to receive cargo into the fuselage of the aircraft and to remove the cargo from the fuselage of the aircraft; attaching curved panel edge frames to the outer skin with the panel edge frames disposed on opposite lateral sides of the cargo opening in the outer skin; and attaching upper and lower sill beams to the panel edge frames with the upper and lower sill beams disposed on opposite upper and lower sides of the cargo opening in the outer skin, the upper and lower sill beams each attached with the panel edge frames, wherein the upper and lower sill beams are positioned to also be attached with curved aircraft frames that are disposed inside the fuselage of the aircraft to secure the outer skin to the fuselage at a panel opening in the fuselage.

Clause 11: The method of clause 10, wherein forming the outer skin includes forming the outer skin from a carbon-fiber reinforced material.

Clause 12: The method of clause 10, further comprising: forming the panel edge frames from a carbon-fiber reinforced material.

Clause 13: The method of clause 10, wherein the upper sill beams include a first upper sill beam and an auxiliary upper sill beam, the upper sill beams attached to the panel edge frames with the first upper sill beam and the auxiliary upper sill beam oriented parallel to each other.

Clause 14: The method of clause 10, wherein the lower sill beams include a first lower sill beam and an auxiliary lower sill beam, the lower sill beams attached to the panel edge frames with the first lower sill beam and the auxiliary lower sill beam oriented parallel to each other.

Clause 15: The method of clause 10, wherein the outer skin is formed to extend from an upper edge to an opposite lower edge and from a forward edge to an opposite rear edge with each of the upper edge and the lower edge extending from the forward edge to the rear edge, each of the panel edge frames is attached to the outer skin with the panel edge frames protruding from the upper edge and from the lower edge of the outer skin, and the outer skin is configured to be coupled with the fuselage of the aircraft using longitudinal splices extending along the upper edge and the lower edge of the panel and using circumferential splices extending along the forward edge and the rear edge of the outer skin to convert the aircraft from a passenger aircraft to a freighter aircraft.

Clause 16: A panel assembly for converting a passenger aircraft to a freighter aircraft, the panel assembly comprising: an outer skin having a curved shaped to replace a removed portion of a fuselage of the passenger aircraft, the outer skin including a cargo opening sized to transfer cargo into and out of the fuselage; elongated edge frames coupled with the outer skin and on opposite first and second sides of the cargo opening in the outer skin; an upper sill beam set disposed on a third side of the cargo opening in the outer skin, the upper sill beam set including parallel upper sill beams connected with the edge frames and shaped to be coupled with elongated aircraft frames to secure the outer skin to the fuselage; and a lower sill beam set disposed on a fourth side of the cargo opening in the outer skin, the lower sill beam set including parallel lower sill beams connected with the edge frames and shaped to be coupled with the aircraft frames to secure the outer skin to the fuselage.

Clause 17: The panel assembly of clause 16, wherein one or more of the outer skin or the edge frames is formed from a carbon-fiber reinforced material.

Clause 18: The panel assembly of clause 16, wherein the edge frames protrude from outer edges of the outer skin.

Clause 19: The panel assembly of clause 16, wherein the outer skin is configured to be coupled with the fuselage using longitudinal splices and circumferential splices along different outer edges of the outer skin.

Clause 20: The panel assembly of clause 16, further comprising: elongated stringers extending along an inside surface of the outer skin, the stringers elongated in directions that are transverse to directions in which the edge frames are elongated.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A panel assembly for an aircraft, the panel assembly comprising:

an outer skin formed from a composite material and configured to form an outer surface of a portion of a fuselage of the aircraft, the outer skin including a cargo opening sized to receive cargo into the fuselage of the aircraft and to remove the cargo from the fuselage of the aircraft;

curved panel edge frames coupled with the outer skin and disposed on opposite lateral sides of the cargo opening in the outer skin; and upper and lower sill beams disposed on opposite upper and lower sides of the cargo opening in the outer skin, the upper and lower sill beams each coupled with the panel edge frames, wherein the upper and lower sill beams are configured to also be coupled with curved aircraft frames that are disposed inside the fuselage of the aircraft to secure the outer skin to the aircraft at a panel opening in the fuselage of the aircraft.

2. The panel assembly of claim 1, wherein the upper and lower sill beams are configured to be coupled with the aircraft frames to enclose the panel opening.

3. The panel assembly of claim 1, wherein the outer skin is formed from a composite material.

4. The panel assembly of claim 3, wherein the composite material is a carbon-fiber reinforced material.

5. The panel assembly of claim 1, wherein the panel edge frames are formed from a carbon-fiber reinforced material.

6. The panel assembly of claim 1, wherein the upper sill beams include a first upper sill beam and an auxiliary upper sill beam oriented parallel to each other with both the first upper sill beam and the auxiliary upper sill beam coupled with the panel edge frames and configured to be coupled with the aircraft frames.

7. The panel assembly of claim 1, wherein the lower sill beams include a first lower sill beam and an auxiliary lower sill beam oriented parallel to each other with both the first lower sill beam and the auxiliary lower sill beam coupled with the panel edge frames and configured to be coupled with the aircraft frames.

8. The panel assembly of claim 1, wherein the outer skin extends from an upper edge to an opposite lower edge and from a forward edge to an opposite rear edge with each of the upper edge and the lower edge extending from the forward edge to the rear edge, each of the panel edge frames protruding from the upper edge and from the lower edge of the outer skin.

9. The panel assembly of claim 1, wherein the panel edge frames are positioned to align with and be connected to corresponding aircraft frames disposed inside the fuselage of the aircraft.

10. A method for providing a panel assembly for an aircraft, the method comprising:

forming an outer skin of an aircraft from a composite material, the outer skin formed to have a shape of a portion of an outer surface of a fuselage of the aircraft, the outer skin formed to include a cargo opening sized to receive cargo into the fuselage of the aircraft and to remove the cargo from the fuselage of the aircraft;

attaching curved panel edge frames to the outer skin with the panel edge frames disposed on opposite lateral sides of the cargo opening in the outer skin; and attaching upper and lower sill beams to the panel edge frames with the upper and lower sill beams disposed on opposite upper and lower sides of the cargo opening in the outer skin, the upper and lower sill beams each attached with the panel edge frames, wherein the upper and lower sill beams are positioned to also be attached with curved aircraft frames that are disposed inside the fuselage of the aircraft to secure the outer skin to the fuselage at a panel opening in the fuselage.

11. The method of claim 10, wherein forming the outer skin includes forming the outer skin from a composite material.

12. The method of claim 11, wherein the composite material is a carbon-fiber reinforced material.

13. The method of claim 10, further comprising:

forming the panel edge frames from a carbon-fiber rein-forced material.

14. The method of claim 10, wherein the upper sill beams include a first upper sill beam and an auxiliary upper sill beam, the upper sill beams attached to the panel edge frames with the first upper sill beam and the auxiliary upper sill beam oriented parallel to each other.

15. The method of claim 10, wherein the lower sill beams include a first lower sill beam and an auxiliary lower sill beam, the lower sill beams attached to the panel edge frames with the first lower sill beam and the auxiliary sill beam oriented parallel to each other.

16. A panel assembly for converting a passenger aircraft to a freighter aircraft, the panel assembly comprising:

an outer skin having a curved shaped to replace a removed portion of a fuselage of the passenger aircraft, the outer skin including a cargo opening sized to transfer cargo into and out of the fuselage;

elongated edge frames coupled with the outer skin and on opposite first and second sides of the cargo opening in the outer skin;

an upper sill beam set disposed on a third side of the cargo opening in the outer skin, the upper sill beam set including parallel upper sill beams connected with the edge frames and shaped to be coupled with elongated aircraft frames to secure the outer skin to the fuselage; and a lower sill beam set disposed on a fourth side of the cargo opening in the outer skin, the lower sill beam set including parallel lower sill beams connected with the edge frames and shaped to be coupled with the aircraft frames to secure the outer skin to the fuselage.

17. The panel assembly of claim 16, wherein one or more of the outer skin or the edge frames is formed from a composite material.

18. The panel assembly of claim 17, wherein the composite material is a carbon-fiber reinforced material.

19. The panel assembly of claim 16, wherein the edge frames protrude from outer edges of the outer skin.

20. The panel assembly of claim 16, further comprising:

elongated stringers extending along an inside surface of the outer skin, the stringers elongated in directions that are transverse to directions in which the edge frames are elongated.

* * * * *